United States Patent
Witkowski et al.

(10) Patent No.: US 8,311,490 B2
(45) Date of Patent: Nov. 13, 2012

(54) SYSTEMS AND METHODS FOR CONFIGURING AND OPERATING A WIRELESS CONTROL SYSTEM IN A VEHICLE FOR ACTIVATION OF A REMOTE DEVICE

(75) Inventors: Todd R. Witkowski, Zeeland, MI (US);
Carl Shearer, Hudsonville, MI (US);
Steven L. Geerlings, Holland, MI (US);
Thomas D. Klaver, Ada, MI (US)

(73) Assignee: Johnson Controls Technology Company, Holland, MI (US)

( * ) Notice: Subject to any disclaimer, the term of this patent is extended or adjusted under 35 U.S.C. 154(b) by 689 days.

(21) Appl. No.: 12/344,082

(22) Filed: Dec. 24, 2008

(65) Prior Publication Data

US 2010/0159846 A1    Jun. 24, 2010

(51) Int. Cl.
*H04B 1/00* (2006.01)
*H04M 3/00* (2006.01)

(52) U.S. Cl. .......................................... 455/70; 455/420

(58) Field of Classification Search ................. 455/41.2, 455/419, 70, 556, 420; 340/442, 12.23
See application file for complete search history.

(56) References Cited

U.S. PATENT DOCUMENTS

| | | | |
|---|---|---|---|
| 6,091,330 A | 7/2000 | Swan et al. | |
| 6,271,765 B1 | 8/2001 | King et al. | |
| 7,019,628 B2 * | 3/2006 | Ichinose | 340/442 |
| 7,084,781 B2 * | 8/2006 | Chuey | 340/12.23 |
| 7,183,933 B2 | 2/2007 | Dzurko et al. | |
| 2003/0067380 A1 | 4/2003 | Bedi et al. | |
| 2004/0110472 A1 * | 6/2004 | Witkowski et al. | 455/41.2 |
| 2005/0026604 A1 * | 2/2005 | Christenson et al. | 455/419 |
| 2009/0128363 A1 | 5/2009 | Wagenhuber et al. | |
| 2009/0170434 A1 | 7/2009 | Tengler et al. | |

FOREIGN PATENT DOCUMENTS

GB    2 404 476 A    2/2005
WO    WO-2006/134024 A1    12/2006

OTHER PUBLICATIONS

U.S. Appl. No. 12/372,653, filed Feb. 17, 2009, Chutorash et al.
U.S. Appl. No. 12/348,154, filed Jan. 2, 2009, Chutorash et al.
U.S. Appl. No. 12/328,663, filed Dec. 4, 2008, Chutorash et al.
Office Communication dated Mar. 21, 2012 and Partial European Search Report dated Mar. 14, 2012 for EP 09015623, 7 pages.

* cited by examiner

*Primary Examiner* — Kent Chang
*Assistant Examiner* — Kuo Woo
(74) *Attorney, Agent, or Firm* — Foley & Lardner LLP

(57) ABSTRACT

Control systems for mounting in a vehicle and for transmitting a signal to a receiver associated with a device for opening or closing a movable barrier when the receiver receives an authorized signal are provided.

20 Claims, 10 Drawing Sheets

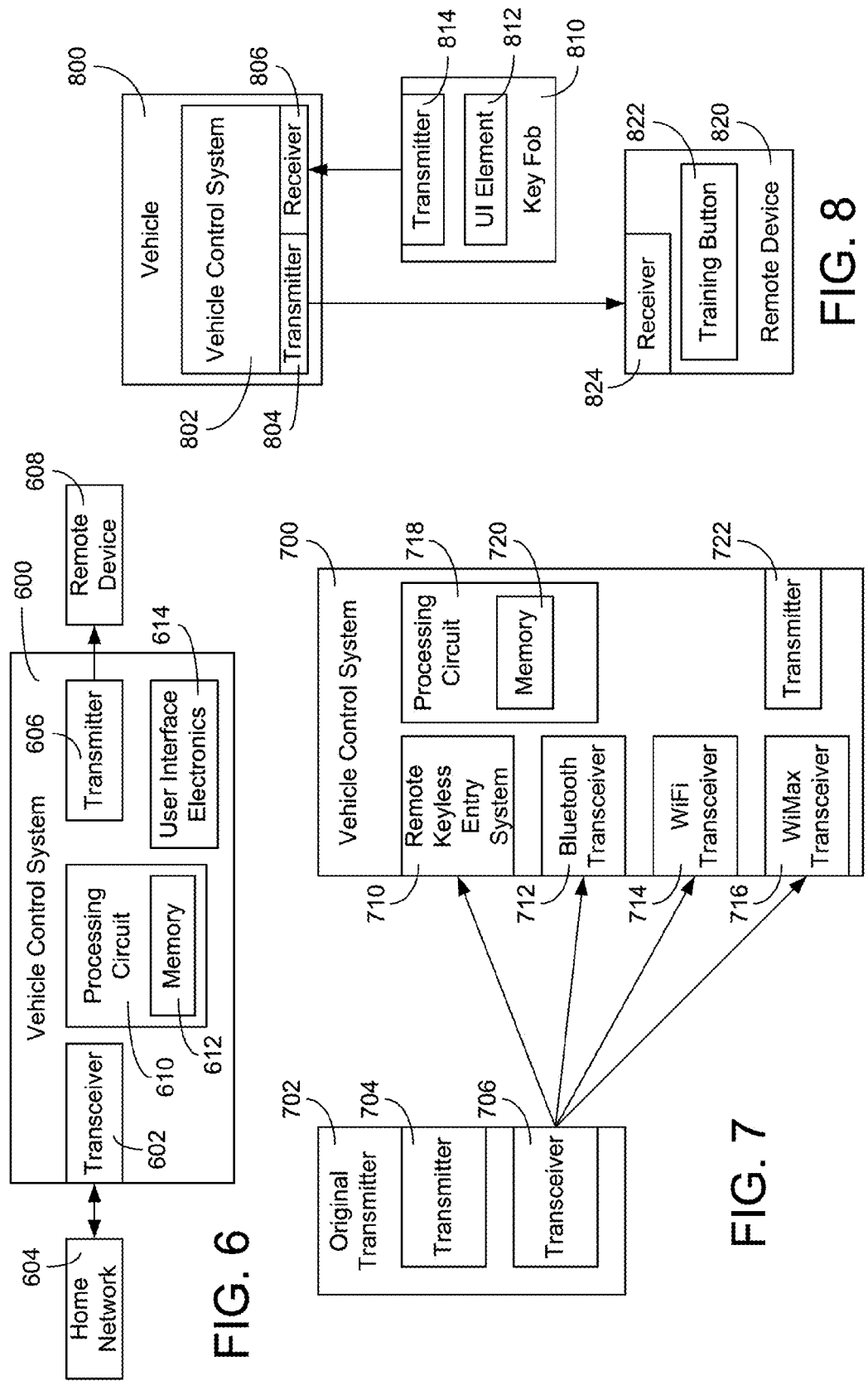

SYSTEMS AND METHODS FOR CONFIGURING AND OPERATING A WIRELESS CONTROL SYSTEM IN A VEHICLE FOR ACTIVATION OF A REMOTE DEVICE

BACKGROUND

The present disclosure generally relates to systems and methods for configuring a wireless control system of a vehicle.

Wireless control systems are provided in vehicles for activities such as actuating a remote device (e.g., a garage door opener), establishing a data communication link with a remote system, establishing a voice communication link with a portable electronic device, and for other purposes.

Vehicle-based wireless control systems are sometimes difficult to configure for use with particular remote devices, systems, and/or portable electronic devices.

Improved systems and methods for configuring a wireless control system of a vehicle are needed.

SUMMARY

One embodiment relates to a control system for mounting in a vehicle and for transmitting a signal to a receiver associated with a device for opening or closing a movable barrier when the receiver receives an authorized signal. The control system includes a transmitter and memory storing a first set of messages for including with transmissions to the receiver from the transmitter. The control system further includes an interface configured to receive a second set of messages from at least one of a portable electronic device and a remote system, wherein the second set of messages comprises a plurality of messages. The control system further includes a circuit configured to provide the second set of messages to the memory for storage. The control system yet further includes a user input interface configured to receive an indication of user input from a user interface element and to provide the indication to the circuit. The circuit may be configured to provide at least one of the messages stored in memory to the transmitter for transmission to the receiver based on the indication received from the user input interface. The control system may include a receiver for receiving a signal from an original portable transmitter pre-configured to send an authorized signal to the receiver. The circuit may be configured to identify a characteristic associated with the received signal and to use the count to select which of the messages stored in memory to provide to the transmitter when the indication is received from the user input interface. The circuit may include memory and a processor, the memory having computer code for execution by the processor and for reprogramming logic of the circuit based on update information received from the interface. The signals and the messages can be rolling code messages, fixed code messages, or any other types of messages.

Another embodiment relates to a control system for mounting in a vehicle and for transmitting a signal to a receiver associated with a device for opening or closing a movable barrier when the receiver receives an authorized signal. The control system includes an interface configured to exchangably receive different transmitters. The control system further includes a power supply configured to supply power to the interface. The control system yet further includes a user input interface configured to receive user input from a user interface element. The control system also includes a circuit communicably coupling the user input interface and the interface for receiving a transmitter. The circuit is configured to utilize different transmitters received by the interface so that common user input received at the user input interface results in like behavior by the different transmitters.

Another embodiment relates to a control system for mounting in a vehicle and for transmitting a signal to a receiver associated with a device for opening or closing a movable barrier when the receiver receives an authorized signal. The control system includes a transmitter and memory storing a plurality of identifiers, each identifier associated with a different possible receiver manufacturer, each different possible remote control system manufacturer associated with at least one message, an algorithm for generating a message, or at least one message and an algorithm for generating a message. The control system further includes an interface for receiving an identifier and a control circuit configured to compare the received identifier to one or more of the plurality of identifiers stored in memory and to cause the transmitter to transmit, based on the comparison, at least one message associated with the manufacturer based on the at least one message stored in memory, the algorithm for generating a message, or the at least one message and the algorithm for generating the message. The control circuit may be configured to transmit a plurality of messages associated with the manufacturer indicated by the received identifier during a process of training the control system to send authenticated transmissions to the receiver.

Another embodiment relates to a control system for mounting in a vehicle and for transmitting a signal to a receiving device associated with a device for opening or closing a movable barrier when the receiving device receives an authorized signal, the receiving device associated with an original transmitter. The control system includes a control circuit and a receiver communicably coupled to the control circuit and configured to receive a first signal from the original transmitter. The control system further includes memory storing a plurality of identifiers, each identifier associated with a different possible algorithm, wherein the first signal comprises an identifier. The control circuit is configured to detect the identifier of the first signal and to use the detected identifier of the first signal and the plurality of identifiers stored in memory to determine which of a plurality of possible algorithms to utilize in order to complete a successful training process with the receiver. The control circuit is further configured to complete the analysis of the first signal without decoding a data portion of the first signal that is used by the receiving device for authentication.

Another embodiment relates to a control system for mounting in a vehicle and for transmitting a signal to a receiver associated with a device for opening or closing a movable barrier when the receiving device receives an authorized signal, the receiving device associated with an original transmitter. The control system includes a receiver configured to receive and recognize a discrete identifier message from the original transmitter before or after a data message. The control system further includes a circuit configured to be provided the discrete identifier message and configured to analyze the discrete identifier message to determine a manufacturer of the remote control system. The control system yet further includes an input from a user interface for receiving a command to transmit a control signal to the receiving device. The control system may further include a transmitter for transmitting control signals to the receiving device. The circuit is configured to cause the transmitter to transmit a first control signal based on the manufacturer in response to a first command received at the input. The circuit is further configured to cause the transmitter to transmit a second control signal based on the manufacturer in response to a second command received at the input. The circuit is yet further configured to receive an indication from the user at the input to indicate whether the first control signal or the second control signal caused the device for opening or closing a movable barrier to respond. The circuit configures itself for future transmissions to the receiving device based on the received indication.

Another embodiment relates to a control system for mounting in a vehicle and for transmitting a signal to a receiver associated with a device for opening or closing a movable barrier when the receiver receives an authorized signal. The control system includes a transmitter and memory storing a plurality of codes, a first group of the codes compatible with old receiver standards and a second group of the codes associated with new receiver standards. The control system further includes an input configured to receiving a command from a user interface element. The control system yet further includes a circuit configured to cause the transmitter to transmit the first group of codes followed by the second group of codes when the command is received at the input.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 6 is a block diagram of a vehicle control system coupled to a home network and remote device, the vehicle control system configured to use information received from the home network in a training routine, according to an exemplary embodiment;

FIG. 7 is a block diagram of an original transmitter and a vehicle control system, the vehicle control system configured to receive information from the original transmitter for use in training, according to an exemplary embodiment;

FIG. 8 is a block diagram of an original transmitter and a vehicle control system, the vehicle control system configured to be commanded by a key fob during a training process, according to an exemplary embodiment;

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for configuring and operating a wireless control system mounted in a vehicle for activation of a remote device are shown and described.

Figure 1:
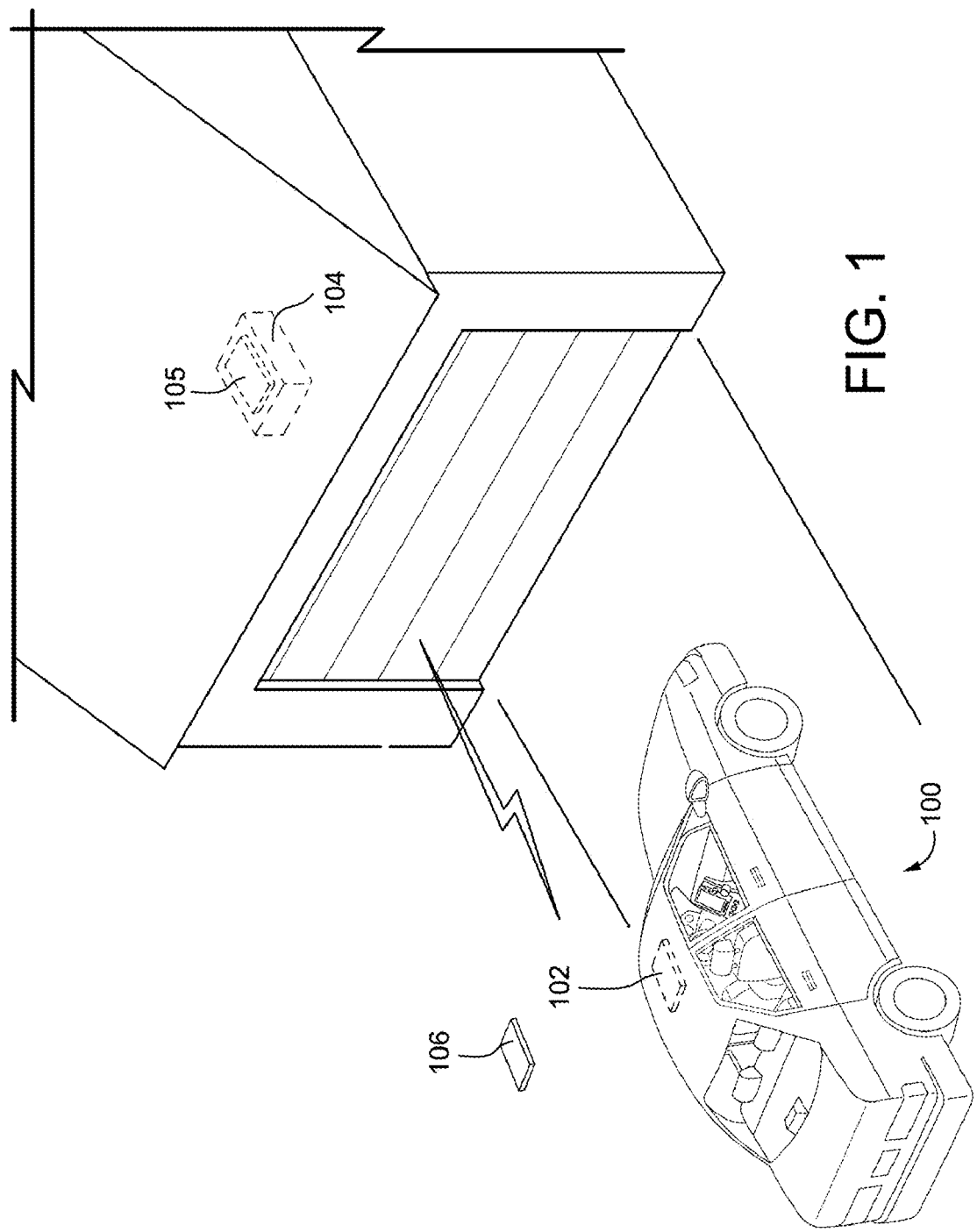
FIG. 1 is a perspective view of a vehicle having a control system configured to provide a control signal to a remote device such as a garage door opener, according to an exemplary embodiment.

Referring now to FIG. 1, a perspective view of a vehicle 100 having a control system 102 configured to provide a control signal (e.g., a formatted radio frequency signal) to a remote device 104 is shown, according to an exemplary embodiment. According to the embodiment shown FIG. 1, remote device 104 is a garage door opener for opening a garage door such as the garage door illustrated in FIG. 1. Remote device 104 includes or is associated with a receiver 105 that receives the control signal and causes (e.g., via one or more signals) the garage door opener to open the garage door based on the received control signal. A receiver included or associated with a remote device such as garage door opener are typically configured to cause the remote device to actuate or change states only if the control signal is determined to be from an authorized device. The receiver typically determines whether or not the control signal is from an authorized device based on characteristics of the control signal. For example, a receiver included or associated with the remote devices may be configured to cause the remote device to actuate or change state if the control signal is sent at a certain frequency or frequencies, includes representations of particular codes, is formatted in a particular way, includes a certain cryptography key, is modulated a certain way, and the like.

A receiver such as receiver 105 included or associated with a remote device such as remote device 104 is typically associated with one or more original portable transmitters such as portable transmitter 106 configured to provide an appropriately formatted control signal to the receiver. Portable transmitter 106 may be an original transmitter sold with remote device 104 and/or previously configured for communications with receiver 105 of remote device 104. Control system 102 mounted in vehicle 100 may not be pre-configured for communications with the user's particular remote device 104 when first sold to a user (with vehicle 100 or otherwise). Vehicle control system 102 can be configured for wireless communications with remote device 104 via a one or more configuration processes (e.g., training processes, setup processes, etc.). For example, control system 102 can include a radio frequency receiver configured to receive radio frequency control signals from portable transmitter 106 and to configure itself using the received radio frequency control signals. According to other exemplary embodiments, control system 102 can include a plurality of stored codes for transmitting with control signals and for actuating a plurality of different types of remote devices such as garage door openers. A training process of this type of system may rely on the control system transmitting the plurality of stored codes in a sequence to the remote device, the user indicating when he or she observes the remote device change states to the vehicle control system; the vehicle control system configuring itself based the timing of the indication (e.g., storing one or more codes associated with the timing of the indication).

Figure 2:
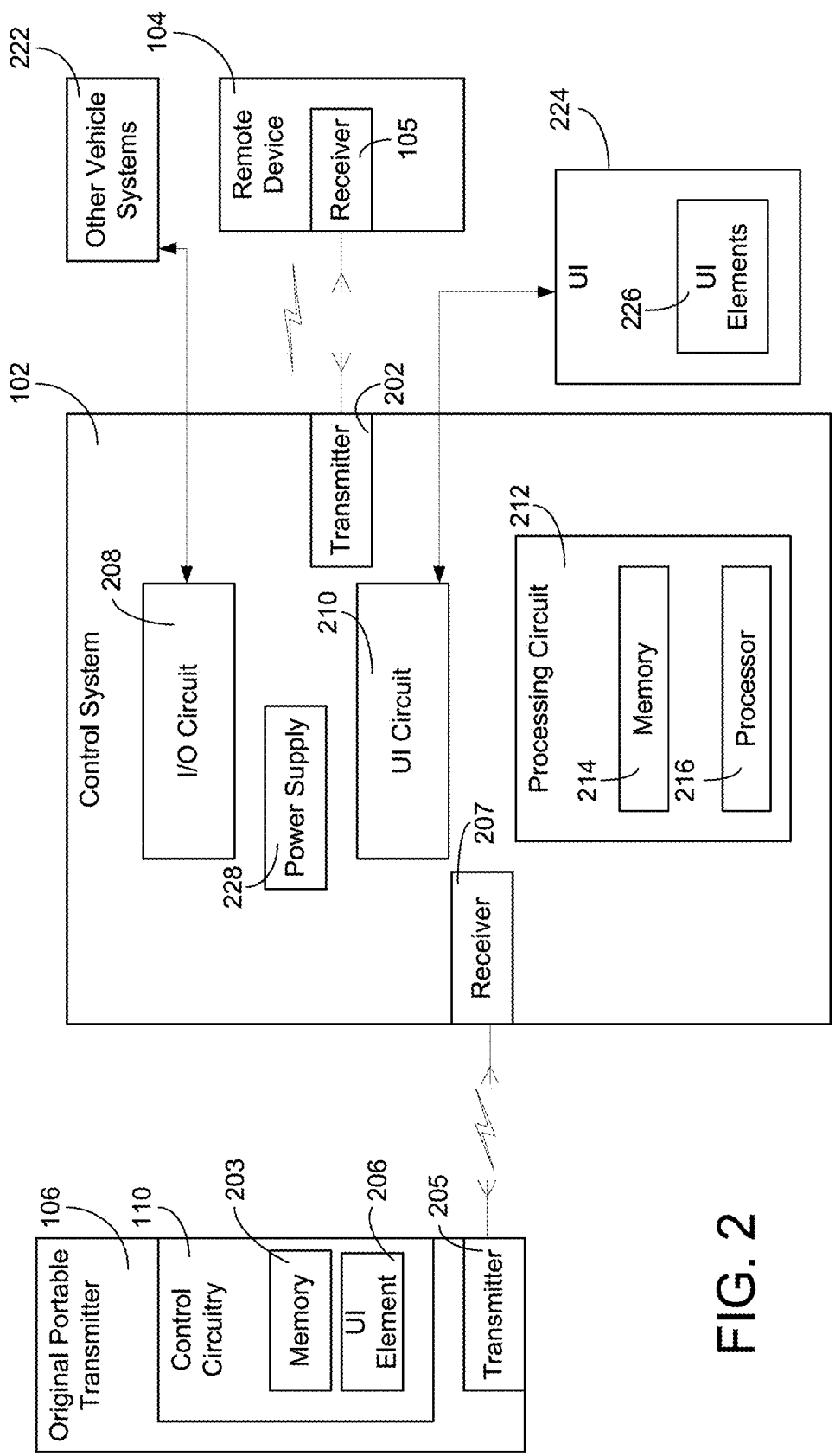
FIG. 2 is a block diagram of a system such as that illustrated in FIG. 1, according to an exemplary embodiment.

Referring now to FIG. 2, a block diagram of the system illustrated in FIG. 1 is shown, according to an exemplary embodiment. Original portable transmitter 106 is shown to include control circuitry 110, transmitter 205, UI element 206, and memory 203. Receiver 207 of control system 102 may be configured to receive information from original portable transmitter 106 via RF communications. Using the received information, control system 102 can configure itself for authenticated transmissions from the control system 102's transmitter 202 to remote device 104's receiver 105. According to various exemplary embodiments, vehicle control system 102 can configure itself without reliance on information received from original portable transmitter 106 via a "guess and test" training method (e.g., the vehicle control signal tests for an authenticated control signal by transmitting a plurality of control signals to the remote device).

Control circuitry 110 of original portable transmitter 106 may generally be configured to format a control signal for transmission to remote device 104 via transmitter 205 or to cause transmitter 205 to format and send the control signal. Control circuitry 110 is shown to include memory 203 for storing information such as information regarding the control signal or remote device 104. Control circuitry 110 further includes UI elements 206 (e.g., buttons, switches, touch-sensitive elements, voice recognition systems, touch screens, etc.) which may be pressed or otherwise used by a user of original portable transmitter 106 to transmit information.

Control system 102 is shown to include transmitter 202 (e.g., a radio frequency (RF) transmitter), I/O circuit 208, UI circuit 210, and processing circuit 212. According to an exemplary embodiment, control system 102 is configured to be mounted to a vehicle such as vehicle 100 (e.g., mounted in a vehicle interior location, a center stack location, a dashboard location, a center console, an overhead console, a floor console, an instrument panel, a door panel, a visor, a rear-view mirror, a headliner location, in multiple vehicle locations, etc.).

According to an exemplary embodiment, control system 102 may transmit a control signal to receiver 105 of remote device 104 based on user input signals received from user interface (UI) 224 at UI circuit 210. For example, when one or more of a plurality of UI elements 226 are pressed or otherwise used, UI circuit 210 and processing circuit 212 may cause RF transmitter 202 to transmit a control signal associated with the pressed or activated UI element 226. The transmission of the control signal can also be triggered based on input received from other vehicle systems 222 via I/O circuit 208. Other vehicle systems 222 may include, for example, a positioning device (e.g., GPS receiver) configured to cause RF transmitter 202 to transmit the control signal based on position information received at I/O circuit 208. Other vehicle systems 222 may also include vehicle communications systems (e.g., configured to receive data from a mobile phone, an Internet source, or otherwise), vehicle center stack control systems, voice recognition systems, body electronics modules configured to receive signals from key fobs or other remote controls, and the like that may be configured to provide signals that control or otherwise affect the behavior of control system 102.

Processing circuit 212 is shown to include memory 214 and processor 216. Processing circuit 212 may be configured to initiate and control the transmission of a control signal by controlling and/or providing information to transmitter 202. When information is received by a circuit 208 or 210, processing circuit 212 may be configured to store the received information in memory, to process the received information using processor 216, and/or to set variables stored in memory 214. Control system 102 is further shown to include a power supply 228 for supplying a power source to control system 102.

Processing circuit 212 and/or processor 216 may be or include one or more integrated circuits, application specific integrated circuits, general purpose processors, memory chips, logic gates, field programmable gate arrays, and/or other electronics components for processing user input, received data communications, and received control signals from other components attached to processing circuit 212 and/or processor 216. Memory 214 may be any type of memory device, may be local to processing circuit 212 (as shown), remote from processing circuit 212, or otherwise communicably coupled to processing circuit 212. Memory 214 can be or include random access memory, read only memory, and/or any other type of memory. Memory 214 can be configured to store codes for communication to various types of remote devices, algorithms for generating codes or control signals for various types of remote devices, variables for storing system or user set values, variables for storing pointers to codes to be used, constant values, transmission schemes, temporary values, receptions from an original transmitter, computer code for execution by processor 216 for executing the various processes described herein or supporting functions, or the like.

Remote device 104 generally includes a receiver 105 for receiving information regarding the use of remote device 104. For example, receiver 105 may be configured to receive a control signal commanding remote device 104 to perform an activity such as opening a garage door. Receiver 105 can be configured to receive a narrow band of frequencies, a wide band of frequencies, communications centered around one or more frequencies, or any type of radio frequency receiver configured to receive communications from original portable transmitter 106 and/or vehicle control system 102. According to an exemplary embodiment, receiver 105 is configured to receive radio frequency communications at around 285-450 Mhz. Receiver 105 may also be configured to process the signals received to determine if the signals are from an authorized source or otherwise expected. For example, receiver 105 may decode or demodulate received transmissions or check decode or demodulate transmissions against a cryptographic algorithm, against a checksum, against a stored value, against a count, or against any other criteria.

Use of an Identifier Message for Vehicle Control System Configuration

As new remote devices are developed, the memory device and/or processing circuit of the vehicle control system may not include logic for receiving, decoding, and training to regular transmissions of original portable transmitters for the new remote devices. According to various exemplary embodiments, however, the vehicle control system may be configured to identify a characteristic such as the manufacturer of the remote device or original portable transmitter and to generate transmissions that may be recognized and authenticated by the remote device based on the identified characteristic.

Figure 3A:
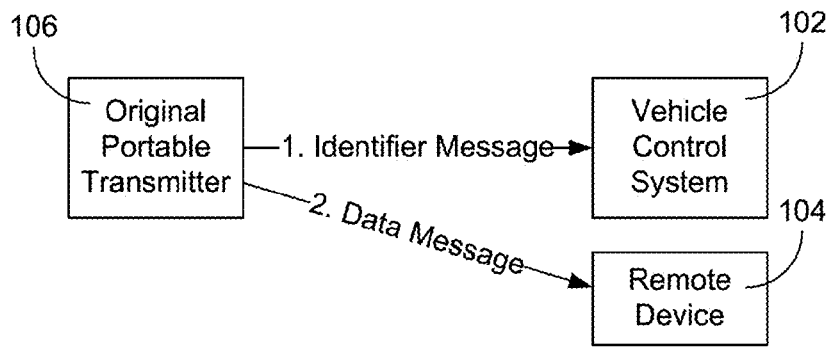
FIG. 3A is a block diagram of an original portable transmitter communicating an identifier message and a data message to a vehicle control system and remote device for training purposes, according to an exemplary embodiment.

Referring now to FIG. 3A, a block diagram of original portable transmitter 106 communicating with vehicle control system 102 and remote device 104 is shown, according to an exemplary embodiment. Some data messages transmitted for authentication to remote device 104 are difficult for devices such as vehicle control system 102 to interpret (e.g., decode, decrypt, etc.). Original portable transmitter 106 shown in FIG. 3A may be configured to transmit an identifier message separately from a data message (e.g., an encrypted data message, an encoded data message, etc.). The identifier message may be used by vehicle control system 102 for training purposes while the data message may be used by remote device 104 to actuate remote device 104 (e.g., to open the garage door) and/or to set remote device 104 into a training mode (e.g., a mode whereby vehicle control system 102 or another device can train to remote device 104 for a period of time).

Figure 3B:
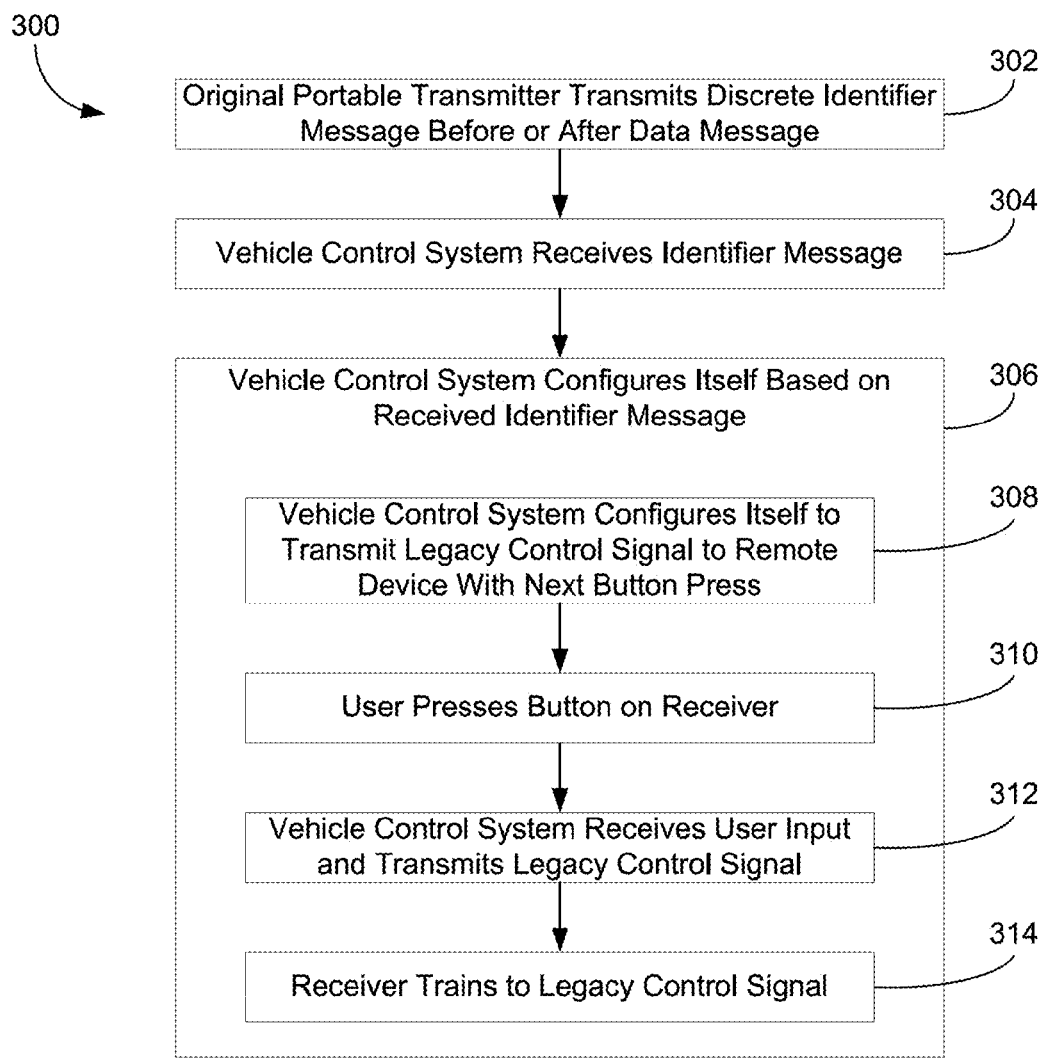
FIG. 3B is a flow chart of a process for configuring a vehicle control system for authenticated transmissions to a remote device using an identifier message transmitted from an original transmitter, according to an exemplary embodiment.

Referring now to FIG. 3B, a flow chart of a process 300 for configuring a vehicle control system for authenticated transmissions to a remote device is shown, according to an exemplary embodiment. Process 300 is shown to include the original portable transmitter transmitting an identifier message (e.g., a discrete identifier message, an identifier message mixed or combined with other information, etc.) before or after transmitting a data message (step 302). The vehicle control system receives the identifier message (step 304) and configures itself based on the received identifier message (step 306). The data message may be a message pre-programmed for authenticated reception by the remote device. The identifier message may be configured to allow a receiver to identify a manufacturer, a model number, a transmission scheme, or any number of characteristics regarding the remote control system. According to an exemplary embodiment, the identifier message may be a three bit binary identifier interpretable by the vehicle control system (e.g., the vehicle control system stores a lookup table of the identifiers in memory, the lookup table associating the possible identifiers with at least one characteristic that can be used during a training process). Different formats or identifier lengths may be transmitted by the original transmitter and interpreted by the vehicle control system. According to various exemplary embodiments, if the vehicle control system is configured with many different codes for many different possible remote devices, upon receiving an identifier message that indicates the remote control system is from brand x, the vehicle control system can configure itself to only transmit brand x codes during a training procedure, or during normal operation. In some embodiments, "normal operation" means user-requested transmissions from the vehicle control system to the remote device after the vehicle control system has been trained to the remote device.

While the vehicle control system may configure itself in a number of different ways based on the received identifier message in step 306, one exemplary configuration process is illustrated in FIG. 3B. As mentioned above, as new remote devices are released by manufacturers, the authentication processes (e.g., and accompanying codes that may be authenticated by the remote devices) may be updated for a number of reasons. While the manufacturer of the remote device may prefer that the new authentication processes be used, the remote devices may be configured to authenticate legacy codes (e.g., old codes and authentication schemes associated with the manufacturer) in addition to new codes. Accordingly, when the vehicle control system receives an identifier message and processes the identifier message to determine a manufacturer of the remote device, the vehicle control system can configure itself to transmit legacy control signals to the remote device (step 308). For example, the vehicle control system can configure itself to transmit one or more legacy control signals to the remote device with the next button press. According to some training processes, a button must be pushed on the receiver (step 310) associated with the remote device to enter the receiver into a training mode (e.g., a learn mode) so that the remote device can configure itself to authenticate messages received from the vehicle control system. The vehicle control system can then receive user input (e.g., a button press, a voice command, etc.) to transmit a control signal to the remote device—and, due to the configuration of step 308, may transmit a legacy control signal to the remote device (step 312). Upon reception of the legacy control signal, the receiver may train to the legacy control signal (e.g., configure itself to accept future control signals similarly formatted from the vehicle control system). The vehicle control system can configure itself to associate the legacy control signal with a user input element (e.g., a button) or a command (e.g., a voice command of "open home garage door") for normal use.

Figure 3C:
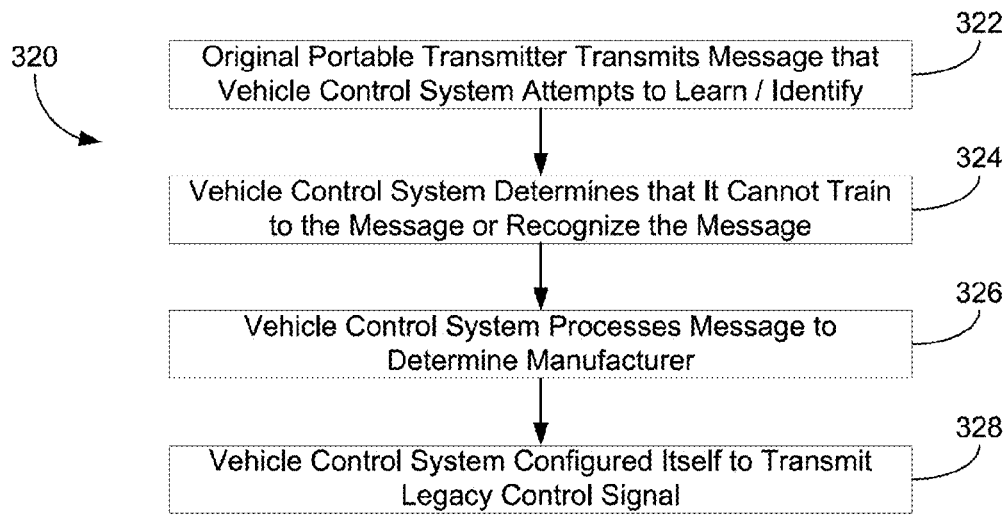
FIG. 3C is a flow chart of a process for configuring a vehicle control system for authenticated transmissions to a remote device by analyzing a control signal transmitted from an original transmitter, according to an exemplary embodiment.

Determining Basic Information for Training by Analyzing an Otherwise Unrecognized Control Signal from the Original Portable Transmitter In some cases, the original portable transmitter may not be configured to transmit a discrete identification message that the vehicle control system can use to identify the manufacturer or other important characteristics of the remote device. According to the embodiment described in FIG. 3C, the vehicle control system is configured to process and/or test any received message(s) from the original portable transmitter to identify the manufacturer or other important characteristics of the remote device. Process 320 includes the original portable transmitter transmitting a message and the vehicle control system attempting to learn and/or identify the message (step 322). If the vehicle control system determines that it cannot train to the message or otherwise recognize the message (step 324) the vehicle control system can be configured to at least process the message to determine the manufacturer (step 326). The vehicle control system can then configure itself to transmit one or more legacy control signals associated with the determined manufacturer (step 328). The vehicle control system can be configured to determine the manufacturer in step 326 in a number of different ways. For example, the vehicle control system can make a determination based on the frequency of the signal received from the original transmitter, a length of the signal, a pattern of the signal, or otherwise.

Figure 3D:
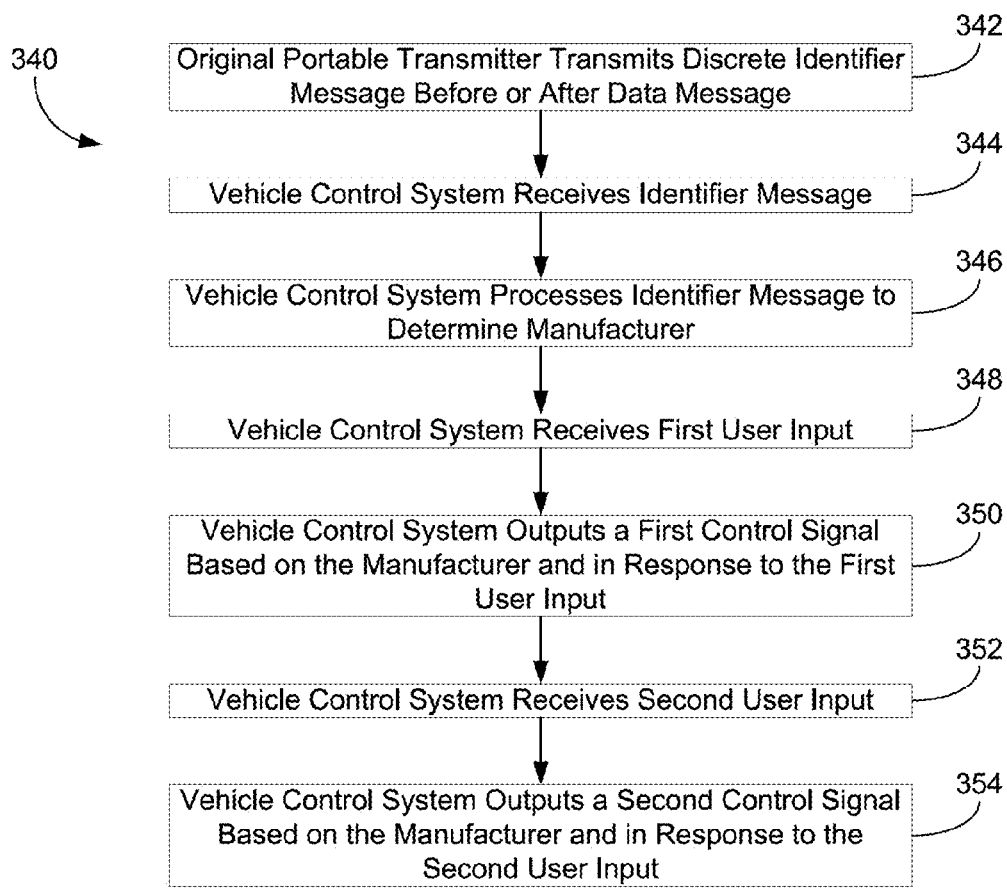
FIG. 3D is a flow chart of a process for training a vehicle control system based on a determined manufacturer, according to an exemplary embodiment.

Training to a Remote Device Manufacturer having Multiple Authentication Algorithms or Code Formats Sometimes multiple types of control signal formats, code types, frequencies, or the like may be associated with one manufacturer. According to the exemplary embodiment of FIG. 3D, the vehicle control system is configured to receive an identifier message (step 344) transmitted from the original portable transmitter before or after a data message (step 342). The vehicle control system processes the identifier message to determine the manufacturer (step 346). According to various alternative embodiments, the manufacturer may be determined via any number of ways rather than based on the receipt of an identifier message. For example, a vehicle control system may be configured to determine the manufacturer based on the control signal format, a code pattern, a frequency band, a frequency center, or the like. Upon determining the manufacturer (e.g., using fuzzy logic, making a determination with a certain level of confidence, etc.) the vehicle control system may configure itself so that transmissions commanded by the user are in accordance with codes associated with the manufacturer. When the vehicle control system receives first user input (step 348) the vehicle control system may transmit a first control signal based on the manufacturer and in response to the first user input (step 350). When the vehicle control system receives second user input (step 352) the vehicle control system may transmit a second control signal based on the manufacturer and in response to the second user input (step 354). According to an exemplary embodiment, the first control signal and the second control signal are associated with different models (e.g., a fixed code model and a rolling code model, an old model and a new model, a legacy model, a model having a first decryption algorithm, a model having a second decryption algorithm, a model configured to accept transmissions at a first frequency, a model configured to accept transmissions at a second frequency, etc.) produced by the determined manufacturer. According to an exemplary embodiment, a plurality of messages associated with the determined manufacturer may be transmitted with each button press in an attempt to find a control signal that is properly authenticated by the remote device. According to other exemplary embodiments, the user interface activity that causes the first and the second different control signals associated with the manufacturer to transmit can be based on holding a button, providing a voice command, providing touch screen input or any other user input activity.

Figure 3E:
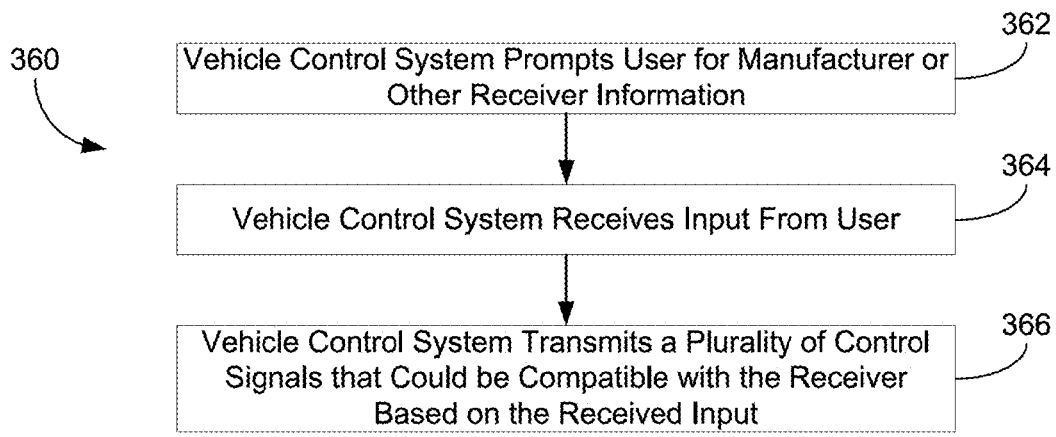
FIG. 3E is a flow chart of a process for training a vehicle control system based on user input regarding receiver information, according to an exemplary embodiment.

Vehicle Control System Selection of Control Signal Format Based on User Input Regarding the Remote Device's Receiver Referring now to FIG. 3E, a flow chart of a process 360 for training a vehicle control system based on user input regarding receiver information is shown, according to an exemplary embodiment. Process 360 is shown to include prompting a user for manufacturer or other receiver information (step 362) and receiving corresponding input from the user (step 364). The vehicle control system can then be configured to transmit a plurality of control signals that could be compatible with the receiver based on the received input (step 366).

Configuration of Vehicle Control System for Authenticated Communication with Remote Device without Use of the Communication Scheme Used by the Original Portable Transmitter Practical, technical, and user-driven difficulties can make processes for training to information received from an original transmitter challenging. Similarly, in systems that use a "guess and test" type training method wherein an original transmitter is not used, the training process can be challenging and/or result in the vehicle control system being trained to a less than optimal control signal. According to various exemplary embodiments described herein, the vehicle control system (e.g., such as that shown in FIG. 2) can be configured to transmit a signal that is unlike or unrelated to the control signal normally sent to a remote device from the device's original transmitter. According to various exemplary embodiments, for example, the processing circuit of the vehicle control system can be configured to cause the vehicle control system's transmitter to transmit a control signal according to a format or protocol unrelated to the original transmitter; the remote device's receiver being configured to receive and authenticate transmissions according to both the format of the original transmitter and the format of the vehicle control system.

Figure 4A:
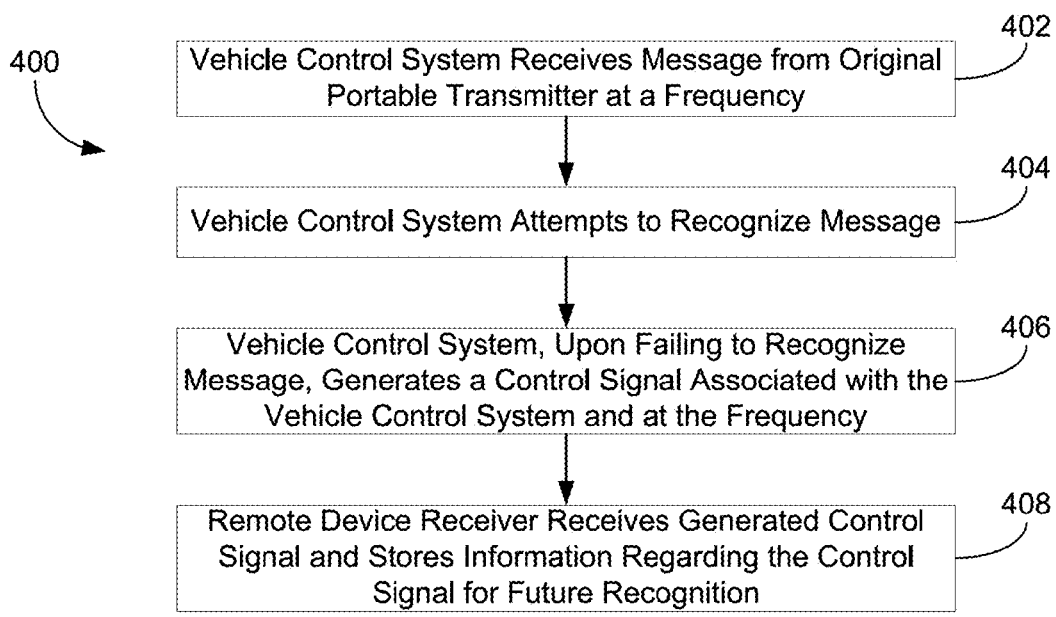
FIG. 4A is a flow chart of a process for training a vehicle control system and a remote device for communications using a format different from that associated with an original transmitter for the remote device, according to an exemplary embodiment.

Referring now to FIG. 4A, a flow chart of a process 400 for training a vehicle control system to a remote device is shown, according to an exemplary embodiment. Process 400 includes receiving a message from an original portable transmitter at a certain frequency (step 402). The vehicle control signal may then attempt to recognize the message (step 404) (e.g., recognize the manufacturer of a remote device associated with the message, recognize the format of the message, recognize the encryption scheme of the message, recognize the rolling code count associated with the message, etc.). Process 400 also includes, upon the vehicle control system failing to recognize the message, generating a control signal associated with the vehicle control system and at the frequency (step 406). For example, according to an exemplary embodiment the vehicle control system is configured to transmit its own type of control signal. The remote device receiver is configured to receive both control signals according to its default format as well as a format associated with the vehicle control system (e.g., associated with the vehicle control system brand, etc.). Once the remote device receives the generated control signal it can store information regarding the control signal for future recognition (step 408).

Figure 4B:
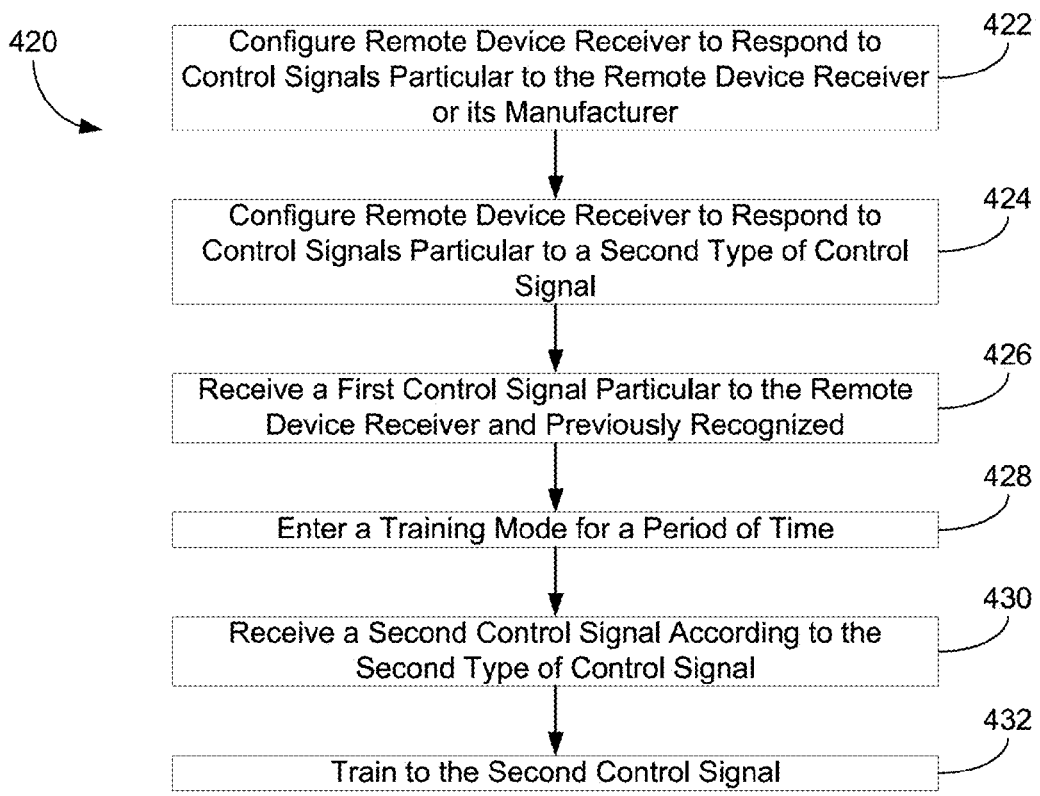
FIG. 4B is a flow chart of a process for configuring a receiver associated with a remote device to receive authenticated transmissions from a vehicle control system having a transmission format different than that associated with an original transmitter for the remote device, according to an exemplary embodiment.

Referring now to FIG. 4B, a flow chart of a process 420 for configuring a receiver of a remote device (e.g., a receiver associated with a garage door opener) is shown, according to an exemplary embodiment. Process 420 is shown to include configuring the remote device receiver to respond to control signals particular to the remote device receiver or its manufacturer (step 422) and configuring the remote device receiver to respond to control signals particular to a second type of control signal (step 424). The second type of control signal may be a vehicle control signal compatible with a type, kind, or brand of vehicle control system or universal transmitter (e.g., a type of control signal compatible with Johnson Controls HomeLink® brand of universal transmitters). Configuring steps 422, 424 may be conducted by the receiver's manufacturer, by an installation technician, or otherwise. Once configured and the receiver is installed, a vehicle control system can train to the receiver and the receiver can train to the vehicle control system. The training process may include receiving a first control signal particular to the remote device receiver and previously recognized (step 426). Step 426 may include, for example, receiving a first control signal from an original portable transmitter where the rolling code count received with the control signal at the remote device receiver is expected. The receiver may be configured to open a training window (e.g., enter a training mode for a period of time) after authenticated reception of the first control signal (step 428). When the training window is open (e.g., the receiver is in a training mode of operation), the receiver can be configured to train to a second control signal (step 432) after the second control signal is received (step 430). The second control signal can be of a different format than that received from the original portable transmitter in step 426. According to an exemplary embodiment, the second control signal is of a format compatible with the vehicle control system manufacturer. According to various alternative embodiments, a user interface associated with the receiver or the remote device may be used to configure the remote device for receiving the second type of control signal from the vehicle control system. For example, according to some exemplary embodiments a button or a series of buttons on a garage door opener may be pressed to set the receiver into a train mode compatible with the second control signal type. According to yet other exemplary embodiments, the receiver may be configured to accept a memory card, an update via a wired or wireless interface, or otherwise capable of receiving updates or commanded configuration changes so that the receiver can recognize, accept, and be trained to the second type of control signal.

Figure 4C:
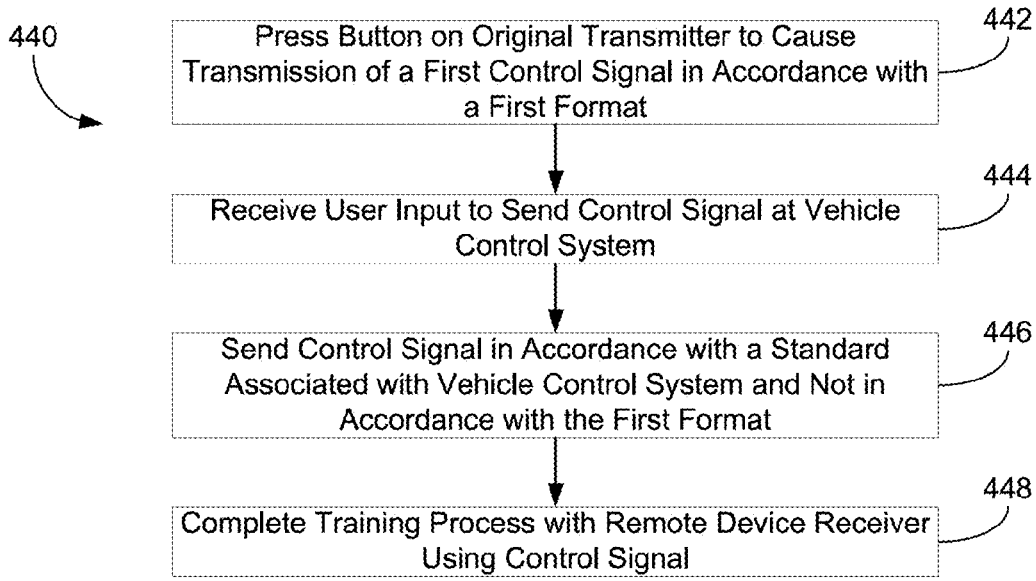
FIG. 4C is a flow chart of a process for training a vehicle control system to communicate with a receiver configured to receive two types of control signals, according to an exemplary embodiment.

Referring now to FIG. 4C, a flow chart of a process 440 for training a vehicle control system to a receiver configured to receive two types of control signals as specified, for example, in FIG. 4B is shown, according to an exemplary embodiment. Process 440 is shown to include pressing a button on the original transmitter to cause transmission of a first control signal in accordance with a first format (step 442). The first format may be a format pre-configured to be compatible with the receiver. When user input is received at the vehicle control system (step 444) the vehicle control system can send a control signal in accordance with a standard associated with the vehicle control system and not in accordance with the first format (step 446). The vehicle control system may be configured to complete the training process with the remote device receiver using the control signal format of the vehicle control system (step 448).

Figure 5:
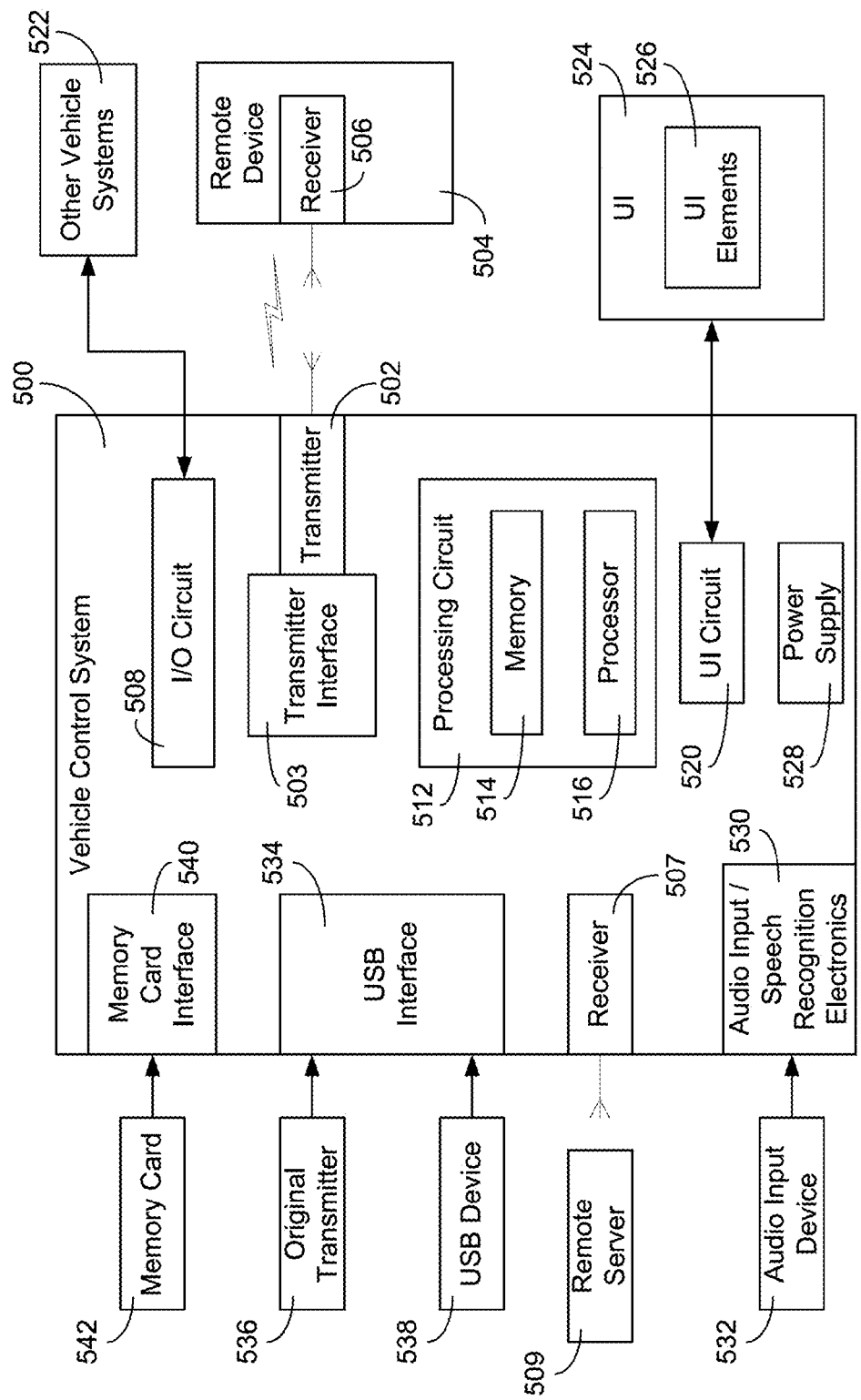
FIG. 5 is a block diagram of a vehicle control system configured to receive information from a plurality of devices, the information for use in training the vehicle control system for use with a remote device, according to an exemplary embodiment.

Systems and Methods for Updating a Vehicle Control System for Compatibility with New or Updated Remote Devices Referring now to FIG. 5, a block diagram of a vehicle control system 500 and various other interfacing devices are shown, according to an exemplary embodiment. Vehicle control system 500 is shown to include a variety of interfaces and communications hardware for receiving information for updating a new or updated remote device. One or more of these interfaces or communications hardware parts may be provided to any one vehicle control system and it should be appreciated that a vehicle control system capable of updating need not include each of the illustrated interfaces.

Vehicle control system 500 is shown to include processing circuit 512 having memory 514 and processor 516. Processing circuit 512 is generally configured to process the update information received via one or more of the interfaces or communications hardware of vehicle control system 500. For example, when new codes or a new algorithm for authenticated reception by remote device 504's receiver 506 are received, processing circuit 512 can properly update the operational algorithm for the vehicle control system based on the received updates. If the updates are new codes, then processing circuit 512 may extract the new codes and update its memory 514 or a memory associated with transmitter 502 with the new codes for transmission to receiver 506. Power supply 528 can be configured to supply power to vehicle control system 500 and/or to one or more of the coupled devices (e.g., if the devices are coupled via a wired connection).

According to an exemplary embodiment, user input received at UI circuit 510 from UI 524 and/or UI elements 526 may be received and used to configure the vehicle control system. The user input may indicate, for example, the manufacturer of remote device 504, a passkey for remote device 504, a model number for remote device 504, a serial number for remote device 504, an algorithm identifier for remote device 504, a count for remote device 504, or any other piece of information regarding remote device 504. The user input may be used directly by processing circuit 512 to configure vehicle control system 500 and/or transmitter 502. According to various other exemplary embodiments, processing circuit 512 may use the received user input to initiate an activity involving one or more of the interfaces to external devices. For example, if a model number or an algorithm identifier is input by a user regarding an unrecognized remote device, processing circuit 512 may include logic that determines an update should be searched for, requested, and/or received from an external device. Processing circuit 512 may request information in a way that is transparent to the user of the vehicle control system, or processing circuit 512 may prompt the user for further input, the connection of an external device, information for connecting to a remote server 509, or other information via UI 524 or otherwise.

Remote server 509 can be a server storing rolling codes, algorithms, crypt keys, or other information that processing circuit 512 can use to configure vehicle control system 500. Remote server 509 can be a source which is directly connected to via receiver 507 or remote server 509 can be a source which is connected to a network to which receiver 507 can directly or indirectly connect. For example, remote server 509 can be an internet server and receiver 507 may be configured to connect to the internet via a mobile phone provider. Processing circuit 512 can cause receiver 507 to request information for updating vehicle control system 500 from remote server 509. Processing circuit 512 can also be configured to be provided the received information from receiver 507 and to use the received information to complete the configuration of vehicle control system 500.

Audio input and speech recognition electronics 530 can be configured to allow a user in the vehicle to speak commands (e.g., requests, utterances, etc.) that are received at audio input device 532 (e.g., a microphone mounted in the vehicle) and to process the commands. Representations of the commands can be provided from audio input and speech recognition electronics 530 to processing circuit 512. Processing circuit 512 may be configured to allow a user to command updates, enter information (e.g., passkey information, manufacturer information, code information, serial number information) regarding remote device 504 using audio input and speech recognition electronics 530.

Other vehicle systems 522 may also be communicably coupled to vehicle control system 500 via I/O circuit 508 another interface, or otherwise. Other vehicle control systems 522 may be or include any user interface systems (e.g., a touch screen system, steering wheel mounted controls, overhead console controls, a connection to a mobile phone, a connection to a portable electronic device brought within the vehicle, a vehicle mounted hands-free communication system, a vehicle data bus system, a remote keyless entry system, a tire pressure monitoring system, a vehicle computer, a vehicle entertainment system, etc.). In some embodiments, vehicle control system 500 may be controlled by one or more of the other vehicle systems (e.g., if the other vehicle system is the primary user interface controller for the vehicle). In some embodiments (e.g., where vehicle control system 500 is a relatively stand-alone a reduced function control system for training for authenticated transmissions to a remote device (e.g., garage door opener)), vehicle control system 500 may only access information and/or receive information from the other vehicle control systems. In yet other embodiments, vehicle control system 500 may be the primary user interface controller for the vehicle and/or communications controller for the vehicle and may be used to control the other vehicle systems 522.

USB interface 534 may be included with vehicle control system 500 for receiving code information from one or more devices 538 also having a USB interface. According to an exemplary embodiment, an original transmitter 536 could be programmed to include one or more codes, identifiers, counts, algorithms or other information which can be transmitted to vehicle control system 500 via USB interface 534. For example, original transmitter 536 may be supplied with the garage door opener and include a unique code for opening the particular garage door opener with which it is sold.

For security reasons the garage door opener may only be able to recognize two of the same code—one for the original transmitter and one for another device. The original transmitter may be configured to manage a token or other identifier which it can only provide to one other device at a time. A universal transmitter such as vehicle control system 500 may be given the token (e.g., the original transmitter stores a unique identifier of the vehicle control system and transmits the unique identifier to the remote device 504 so that the remote device will authenticate transmissions from vehicle control system 500) when plugged into USB interface 534 and also given a code or codes and/or an algorithm for communicating with remote device 504. When original transmitter 536 is plugged into a different device (e.g., a different vehicle control system) original portable transmitter 536 may learn that system's identifier and communicate the identifier to remote device 504 so that the new system and remote device 504 can train. Remote device 504 will no longer accept the vehicle control system 500's transmissions and may now accept the new system's transmissions.

According to an exemplary embodiment, USB device 538 can be a "thumb drive" or another memory device (e.g., a hard drive, a flash drive, a memory card reader, etc.) configured to read and/or write information stored thereon to and/or from USB interface 534. The thumb drive may be mailed or otherwise provided to a user of a remote garage door opener for programming devices such as vehicle control system 500 for operation with the garage door opener. The thumb drive may store one or many codes (e.g., tens, hundreds, thousands) that the vehicle control system may use to communicate with remote device 504. When plugged into or otherwise connected to USB interface 534, the thumb drive can transfer all or a portion of the codes to memory 514 as controlled by processing circuit 512. If the thumb drive includes codes for multiple models or types of remote device, processing circuit 512 may be configured (e.g., via software on USB device 538) to prompt the user for input regarding information (e.g., model of the remote device, manufacturer of the remote device, serial number of the remote device, a passkey for accessing the information on the thumb drive, etc.).

Memory card interface 540 may be configured similarly to the USB interface described above and vehicle control system 500 may utilize information stored on memory card 542 in a fashion similar to how the vehicle control system 500 can use connected USB devices. According to yet other exemplary embodiments, memory card interface 540 may communicate differently with memory card 542. For example, a user may need to execute a program stored on memory card 542 using a file management utility of processing circuit 512. According to yet other exemplary embodiments, whenever memory card 542 is inserted into memory card interface 540, processing circuit 512 reads memory card 542 for transmitter configuration information (e.g., information that can be used by vehicle control system 500 so that vehicle control system 500 can send authenticated transmissions to remote device 504). Memory card 542 can be a flash card, a compact flash card, a SIM card, or a card of any other type or technology. According to an exemplary embodiment, memory card 542 and memory card interface 540 are utilized and are configured to be utilized exclusively for receiving information that enables authenticated communications between vehicle control system 500 and remote device 504.

According to other exemplary embodiments, vehicle control system 500 includes a transmitter interface 503 that is configured to allow user removal and provision of transmitter 502. According to an exemplary embodiment, transmitter circuit 502 for vehicle control system 500 may be upgraded by removing the old transmitter and plugging in or otherwise providing/connecting transmitter 502 to the vehicle control system. According to an exemplary embodiment, processing circuit 512 is configured to recognize a newly plugged-in transmitter and is configured to utilize transmitter 502 to transmit authenticated control signals to remote device 502 and/or to train vehicle control system 500 for authenticated transmissions to remote device 504. According to yet another exemplary embodiment, the device plugged into the vehicle control system may be a circuit board (e.g., daughter board, update board, etc.) configured to update the vehicle control system's transmitter, memory for the transmitter, or memory for the vehicle control system. The circuit board may be removed from the interface to which it is installed when the update is complete or the circuit board may remain installed in an interface of the vehicle control system.

It is important to note that many of the methods described herein can be utilized with vehicle control system 500 shown in FIG. 5. For example, many of the particular training and/or remote device actuation processes described herein can be programmed into a vehicle control system utilizing the interfaces, communications devices, and/or logic processes described with reference to FIG. 5.

Referring now to FIG. 6, vehicle control system 600 is shown for utilizing information received from home network 604 to configure itself for authenticated transmissions to remote device 608. Vehicle control system 600 is shown to include transceiver 602, processing circuit 610, transmitter 606, and user interface electronics 614. Transceiver 602 may be an IEEE 802.11 compatible transceiver, a WiMax transceiver, a Bluetooth transceiver, a ZigBee transceiver, or any other transceiver compatible with wireless home networking devices. A user of home network 604 may be able to download codes for communicating with remote device 608 via a personal computer connected to home network 604. Vehicle control system 600 and/or processing circuit 610 may be configured to receive communications "pushed" to the transceiver 602 via a device of home network 604 or vehicle control system 600/processing circuit 610 may be configured to allow a user to request the information from home network 604 using user interface electronics 614 (e.g., buttons, a touch screen, a keypad, a dial, a voice recognition system, etc.). For example, if a user purchases a new remote device 608 (e.g., a new garage door opener) for which vehicle control system memory 612 does not already include codes and/or algorithms for use with remote device 608, the user can control the update process with controls in the vehicle. The user might, by way of further example, select a menu option such as "Update HomeLink®." Upon selection of the menu option, vehicle control system 600 may prompt the user to enter information regarding remote device 608. Using the entered information, vehicle control system 600 can communicate a request for an update to home network 604 (e.g., and/or to a device thereon). According to an exemplary embodiment, if home network 604 is connected to the internet, vehicle control system 600 can connect to a remote server for the update via home network 604. In another embodiment, a vehicle manual may instruct a user to access a website with his or her home computer (e.g., http://www.homelink.com/) to request updates for vehicle control system 600 to be compatible with remote device 608. The user can download software that is installed on a personal computer for transferring the updates to vehicle control system 600. The software may request a connection to vehicle control system transceiver 602, which a user can accept via user interface electronics 614, and transmit the update to vehicle control system 600. Processing circuit 610 can then use the user interface electronics to ask the user whether he or she would like to install the available vehicle control system update. The update may include, for example, one or more fixed codes, rolling codes, or other messages for transmission to remote device 608. Once updated, vehicle control system 600 can be trained with remote device 608 (e.g., so that remote device 608 can expect to receive a message from vehicle control system 600 including vehicle control system 600's identifier, to synchronize a rolling code count, etc.). The training process may or may not involve an original transmitter, depending on remote device 608 or the embodiment of vehicle control system 600. According to an exemplary embodiment, as a part of the update from a home network or personal computer, the software installed on the personal computer can configure the vehicle control system to transmit particular codes and/or to associate particular codes, code schemes, algorithms, or the like with particular user interface elements in the vehicle. In some exemplary embodiments, the home network may be used to both download software (e.g., a new algorithm, a new code set) for the vehicle control system and to particularly configure the vehicle control system to conduct a first transmission when a first vehicle-mounted user interface element is actuated and to particularly configure the vehicle control system to conduct a second transmission when a second vehicle-mounted user interface element is actuated. For example, the personal-computer installed software can use a wireless communications link with the vehicle control system to associate rolling code 'x' with button 'a' and rolling code 'y' with button 'b'.

Referring now to FIG. 7, a block diagram of an original transmitter 702 and a vehicle control system 700 is shown, according to an exemplary embodiment. Original transmitter 702 is shown to include a transmitter 704 as well as a transceiver 706. Transmitter 704 may be a transmitter specifically configured for authenticated transmissions to a remote device such as a garage door opener. According to an exemplary embodiment, transmitter 704 is configured to transmit between a frequency range of about 285 Mhz to 450 Mhz signals. Transceiver 706 may be configured for transmissions to and/or from systems 710-716. While transceiver 706 is mentioned as having both transmit and receive functionality, it should be appreciated that transceiver 706 may not include a receiver and may only be a transmitter, according to various alternative embodiments. Vehicle control system 700 is shown to include processing circuit 718 and memory 720, which may be configured as previously described with reference to vehicle control system processing circuits and/or memory devices. Transmitter 722 is configured to transmit control signals to the remote device for the purpose of training and/or for the purpose of normal transmissions (e.g., actuating transmissions, authenticated transmissions, etc.) to the remote device. According to an exemplary embodiment, vehicle control system 700 includes one or more of systems/devices 710-716 and the systems/devices and processing circuit 718 are configured to use receptions at systems/devices 710-716 to receive and use information from transceiver 706 for the purpose of configuring vehicle control system 700 for communications with the remote device. For example, vehicle control system 700 may utilize a link with the remote keyless entry system 710 to receive one or more codes for storage in memory 720 and for communication to a garage door opener or other remote device via transmitter 722. Similarly, Bluetooth transceiver 712, WiFi transceiver 714, and/or WiMax transceiver 716 may be configured to receive information about the remote device to which vehicle control system 700 will be trained from original transmitter transceiver 706.

Referring now to FIG. 8, a block diagram of vehicle control system 802 is shown mounted in vehicle 800, according to an exemplary embodiment. Vehicle control system 802 is configured to transmit control signals to remote device 820 via transmitter 804. According to the exemplary embodiment shown in FIG. 8, remote device 820 includes a training button 822 (or another user interface element) for setting remote device 820 into a training mode—during which remote device 820 can configure itself to receive and authenticate control signals from a device (e.g., vehicle control system 802) different than the original transmitter. Actuation of training button 822 may only cause the training mode to be enabled (e.g., during which a time window is open for receiving and processing control signals for training purposes) for a short period of time (e.g., 30 seconds, 10 seconds, less than one minute, one minute, less than 2 minutes, etc.). During the period of time that the training mode is enabled, the user must cause vehicle control system 802 to transmit a control signal to receiver 824 so it can be learned by remote device 820. According to an exemplary embodiment, the user can cause vehicle control system 802 to transmit a control signal to receiver 824 using key fob 810 which is configured with a transmitter 814 and a UI element 812. According to an exemplary embodiment, one or more UI element activities (e.g., a series of button presses, holding a button down, pressing a small button hidden under the battery cover, pressing a small button with a pen tip, etc.) can cause a circuit within key fob 810 to transmit a signal formatted for recognized reception by receiver 806 and formatted to cause vehicle control system 802 to transmit a control signal for receiver 824 via transmitter 804. It should be appreciated that transmitter 814 and receiver 806 may be configured for any type of wireless communications (e.g., optical, radio frequency, standards-based, proprietary, Bluetooth, ZigBee, etc.).

Transmitting Different Codes in Different Windows for "Guess and Test" Type Training Systems In some training systems that are sometimes called "guess and test" type training systems, the transmitter sends many different codes to the receiver and, upon observation of a valid reception, the vehicle control system stores the likely code or codes that resulted in the valid reception. As new remote devices (e.g., garage door openers) are released with new codes, the number of codes that the transmitter uses during a guess and test training process correspondingly increases. However, due to a number of factors including, for example, a relatively short training window used by various commercialized receivers, regulations regarding how long a transmitter can continuously transmit, transmitters may not be configured to transmit all of the codes stored in memory in sequence.

Figure 9:
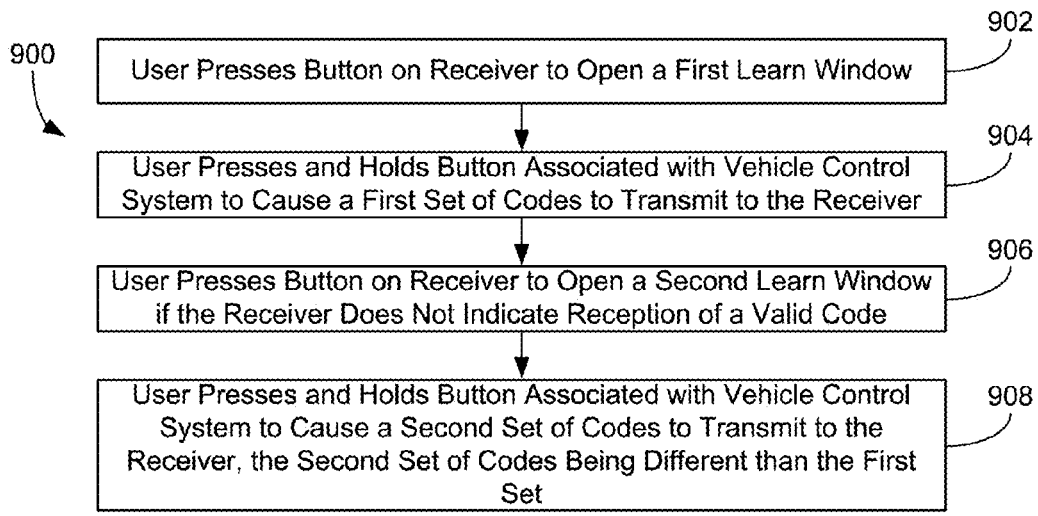
FIG. 9 is a flow chart of a process for training a vehicle control system and a receiver of a remote device for authenticated communications, the vehicle control system being configured to transmit a different set of codes for a different training window of the receiver, according to an exemplary embodiment.

Referring now to FIG. 9, a flow chart of a process 900 for training a "guess and test" type vehicle control system and a receiver of a remote device for authenticated communications is shown, according to an exemplary embodiment. Process 900 is shown to include a user pressing a button on a receiver to open a first learn window (step 902). Process 900 further includes a user pressing and holding a button associated with the vehicle control system to cause a first set of codes to transmit to the remote device receiver from the vehicle control system (step 904). If the receiver does not indicate reception of a valid code, the user can press a button on the receiver to open a second learn window (step 906). When the user again presses and holds a button associated with the vehicle control system, a second set of codes will be transmitted to the receiver (step 908), the second set of codes being different than the first set of codes. In other words, FIG. 9 illustrates a process wherein the vehicle control signal is configured to transmit a second group of codes (e.g., sequentially, in a condensed fashion, etc.) upon a second "training" request (e.g., received by a user button press, received via touch screen, etc.). According to an exemplary embodiment, the vehicle control system may be configured to begin a "guess and test" training process upon receiving a user command to do so, and may train (e.g., store one or more codes in memory) when the user (or the remote device) provides an indication that a recently transmitted code resulted in an authenticated reception (e.g., the garage door is observed to open and the user provides input stating as much, the remote device sends a signal indicating authenticated reception back to the vehicle control system).

Sending Condensed Messages During a "Guess and Test" Training Procedure

Figure 10:
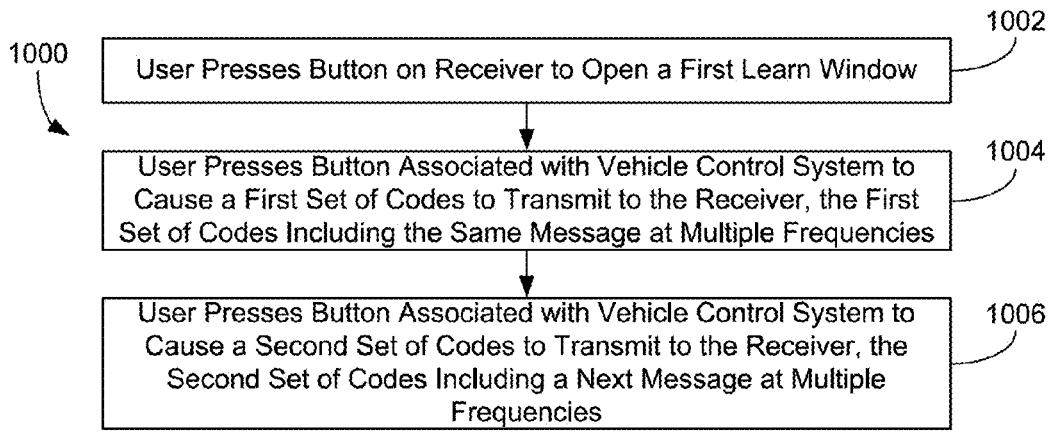
FIG. 10 is a flow chart of a process for transmitting messages from a vehicle control system to a remote device during a training procedure, the messages being condensed, according to an exemplary embodiment.

Referring now to FIG. 10, a flow chart of a process 1000 is shown for transmitting condensed messages (e.g., codes) from a vehicle control system to a remote device during a "guess and test" type training procedure, according to an exemplary embodiment. Process 1000 is shown to include a user pressing a button on a receiver to open a first learn window (step 1002). It is important to note that the learn window of the receiver may be opened via any number of different methods (e.g., by sending an original transmitter control signal to the receiver, by pressing a button on a wall of a garage door opener, etc.). Process 1004 further includes a user pressing a button associated with the vehicle control system to cause a first set of codes to transmit to the receiver, the first set of codes including the same message transmitted at multiple frequencies (step 1004). Process 1006 is further shown to include the user again pressing a button associated with the vehicle control system to cause a second set of codes to transmit to the receiver, the second set of codes including a next message at multiple frequencies (step 1006).

Figure 11:
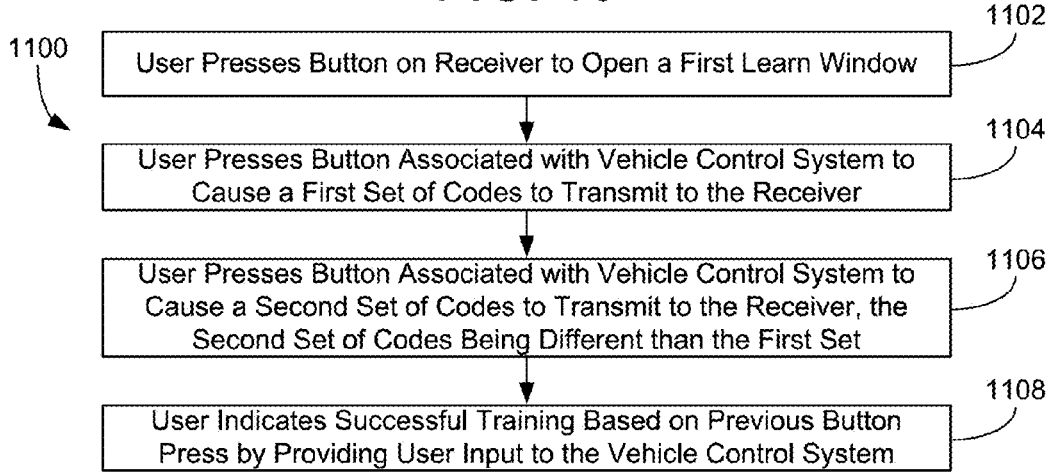
FIG. 11 is a flow chart of a process for training a vehicle control system based on user input received during a training procedure, according to an exemplary embodiment.

Training a Vehicle Control System Based on User Input Received During a "Guess and Test" Type Training Procedure Referring now to FIG. 11, a flow chart of a process 1100 is shown for transmitting training a vehicle control system based on user input received during a "guess and test" type training procedure, according to an exemplary embodiment. Process 1100 is shown to include opening a first learn window at the receiver in response to user input (e.g., a user pressing a button) or another triggering activity (step 1102). Process 1100 is further shown to include causing a first set of codes to transmit to the receiver in response to input received at the vehicle control system (step 1104). Process 1100 is shown to further include causing a second set of codes to transmit to the receiver, the second set of codes being different than the first set (step 1106). Process 1100 is further shown to include the user indicating that the second set of codes resulted in a successful reception by the remote device by providing user input to the vehicle control signal (step 1108). In other words, FIG. 11 illustrates a process whereby the user conducts an input activity to transmit different sets of codes and provides a different input activity when one of the sets of codes results in a successful reception by the remote device. It is important to note that the successful reception can be indicated by the remote device if the remote device includes a transmitter or a transceiver for communicating with the vehicle control system. Regardless of how received, when the vehicle control system receives an indication that the remote device has received a recognized control signal, the vehicle control system will train itself to one or more of the recently transmitted codes. For example, the vehicle control system may store a pointer to the last-transmitted code (or set of codes) for use in normal mode activities (e.g., so that input requesting transmission to a garage door opener results in the proper code being transmitted to the garage door opener). According to various exemplary embodiments, this activity may be repeated over time to narrow down to which code is actually (e.g., probably) the valid code that causes the remote system to actuate. For example, the last set of codes indicated by the user to be accepted by the remote device might include a plurality of codes (e.g., ten code). A second iteration of the training activity might include the first five codes in a first button press and the second five codes in a second button press, the user provided with a mechanism to indicate which of the code series caused the remote device to actuate. Accordingly, the training process might prompt the user for two or more training "rounds" to obtain a small code set for storing in memory for regular transmission to the remote device. In yet other exemplary embodiments, the user's behavior during regular transmissions to the remote device, over time, can be used to reduce the number of codes transmitted to the remote device. For example, the user can be instructed to hold the transmit button down until he or she sees the remote device actuate. If the user releases the button prior to the entire set of currently trained codes transmitting, the vehicle control system can be configured to remove the codes after the button release from the transmission queue for the next time the user presses the button. Further, in yet other exemplary embodiments, the vehicle control system is configured to observe the user's behavior by attempting to reorder the codes for transmission and/or to attempt leaving some codes out of a transmission. For example, the vehicle control system may be configured to randomly (or otherwise) try removing codes from a transmission. If the vehicle control system observes that the transmission worked without the removed codes (e.g., if the user does not press the button again then the transmission probably worked, if the user drives forward and parks the car shortly after transmission then the transmission probably worked, etc.), then the vehicle control system will not transmit that code again. This "pruning" process can be repeated over time to result in a short list of codes for transmission to the remote device during normal operation—improving the observed responsiveness of the vehicle control system relative to the remote device.

Sorted Codes for Transmissions During a "Guess and Test" Type Training Procedure Some remote device receivers have longer "guess and test" type learning windows than others. For example, a first "guess and test" type receiver may hold a learning window open for thirty seconds while a second "guess and test" type receiver may hold its learning window open for forty seconds or fifty seconds. According to an exemplary embodiment, a vehicle control system is configured to transmit codes in an sorted order corresponding to learning window lengths of receivers associated with the stored codes.

Figure 12:
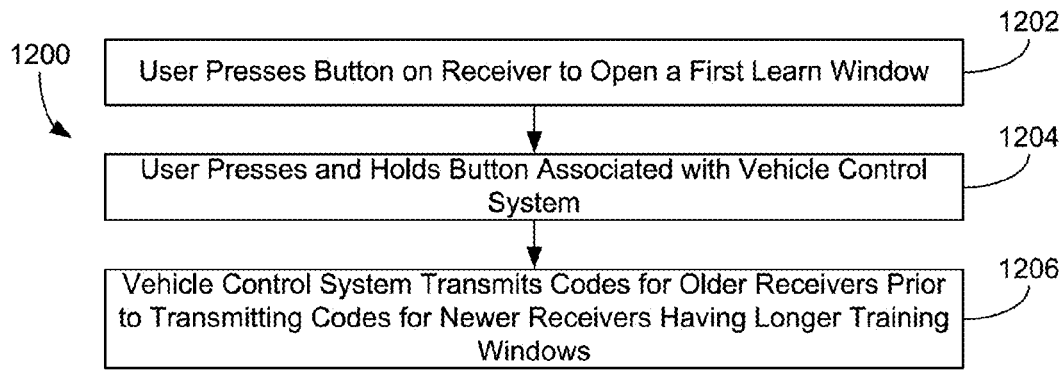
FIG. 12 is a flow chart of a process for training a vehicle control system for communications to a receiver, the codes transmitted to the receiver for training purposes having a sort order to compensate for differing receiver learn window lengths, according to an exemplary embodiment.

Referring now to FIG. 12, a flow chart of a process 1200 is shown for operating a receiver and a vehicle control system in "guess and test" type training procedure, according to an exemplary embodiment. Process 1200 is shown to include opening a first learn window at the receiver (e.g., via button press at the receiver)(step 1202). Process 1200 is further shown to include receiving user input at a vehicle control system (step 1204) and transmitting codes for older receivers prior to transmitting codes for newer receivers and/or receivers having longer training windows (step 1206). In other words, codes for use by a vehicle control system in a "guess and test" type training procedure are transmitted to the receiver in an order at least partially based on an expected training window at the receiver for receiving the codes.

Requesting a Longer Learning Window From a "Guess and Test" Type Receiver

Figure 13:
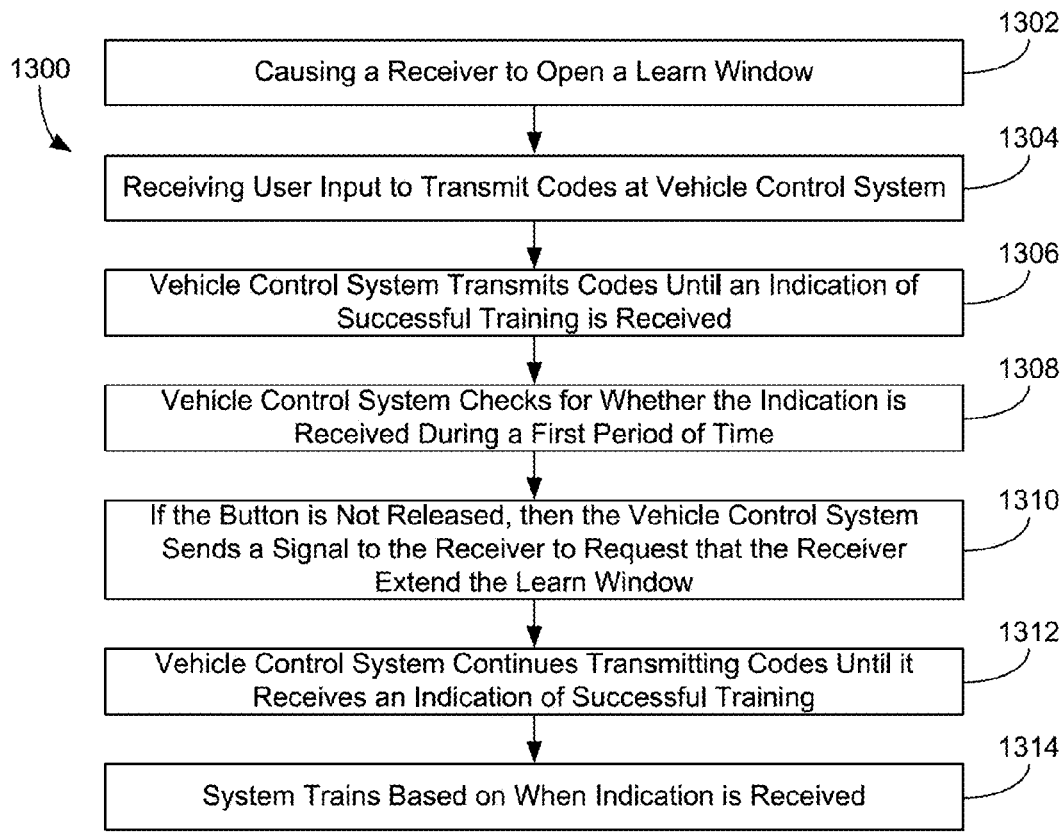
FIG. 13 is a flow chart of a process for using a vehicle control system to request a longer learning window from a receiver via a wireless transmission, according to an exemplary embodiment.

Referring now to FIG. 13, a flow chart of a process 1300 is shown for using a vehicle control system to request a longer learning window from a "guess and test" type receiver, according to an exemplary embodiment. Process 1300 is shown to include causing a receiver to open a learn window (step 1302). Process 1300 is further shown to include receiving user input at the vehicle control system to transmit codes to the remote device for the purpose of "guess and test" type training (step 1304). The vehicle control system will transmit codes until it receives an indication of successful training (step 1306). After transmitting a number of codes, the vehicle control system may check for whether the indication is received during a first period of time (step 1308). If the button is not released, then the vehicle control system sends a signal to the receiver to request that the receiver extend the learn window (step 1310). Upon receiving the request, the receiver may open a second learning window or extend the first learning window. The vehicle control system then continues transmitting codes until it receives the indication of successful training (step 1312), with the vehicle control system training (e.g., storing one or more codes or pointers to codes) based on when the indication is received (step 1314).

Various Alternative Configurations of the Above-Described Embodiments

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The construction and arrangement of the systems as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. For example, although some of the embodiments described above are described with reference to rolling code messages or signals, other embodiments may be configured to conduct the same activities on, with, or using fixed code messages or a combination of rolling code messages and fixed code messages.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for mounting in a vehicle and for transmitting a signal to a receiver associated with a device for opening or closing a movable barrier when the receiver receives an authorized signal, the control system comprising:
   a transmitter;
   memory storing a first set of messages for including with transmissions to the receiver from the transmitter;
   an interface configured to receive a second set of messages from at least one of a portable electronic device and a remote system, wherein the second set of messages comprises a plurality of messages;
   a circuit configured to provide the second set of messages to the memory for storage; and a user input interface configured to receive an indication of user input from a user interface element and to provide the indication to the circuit;
wherein the circuit is configured to determine whether to provide:
  (a) at least one message of the first set of messages, or
  (b) at least one message of the second set of messages,
from the memory to the transmitter for transmission to the receiver in response to the indication received from the user input interface, wherein the determination is based on whether the second set of messages is associated with a supported transmission scheme of the transmitter, wherein the circuit determines to provide the at least one message of the first set of messages when the second set of messages is not associated with a supported transmission scheme of the transmitter;
wherein the first and second set of messages comprise at least one of rolling code messages and fixed code messages.

2. The control system of claim 1, further comprising:
wherein the interface is a receiver for receiving a signal from an original portable transmitter, wherein the original portable transmitter is pre-configured to send an authorized signal to the receiver;
wherein the circuit is configured to identify a characteristic associated with the received signal and to use the characteristic in the determination regarding which of the first and second sets of messages stored in memory to use in providing the at least one message to the transmitter when the indication is received from the user input interface.

3. The control system of claim 1, wherein the interface is a USB interface configured to connect to a portable electronic device with a USB connector.

4. The control system of claim 1, wherein the interface is a transceiver configured for receiving wireless communications from the remote system and/or the portable electronic device.

5. The control system of claim 4, wherein the transceiver is configured to communicate according to at least one of a Bluetooth specification, an IEEE 802.11 specification, a WiFi specification, a WiMax specification, a cellular phone specification, and a ZigBee specification.

6. The control system of claim 1, wherein the interface is at least one of a remote keyless entry receiver and an RF receiver associated with a tire pressure monitoring system; and
wherein the portable electronic device is at least one of a mobile phone, a key fob, and a personal digital assistant.

7. The control system of claim 1, wherein the circuit is configured to reprogram logic of the circuit based on update information received from the interface;
wherein the interface is a memory card reader.

8. A control system for mounting in a vehicle and for transmitting a signal to a remote receiver associated with a device for opening or closing a movable barrier when the remote receiver receives an authorized signal, the control system comprising:
a transmitter;
memory storing a plurality of identifiers, each identifier associated with a different possible remote receiver manufacturer, each different possible remote control system manufacturer associated with at least one message, an algorithm for generating a message, or at least one message and an algorithm for generating a message;
an interface for receiving an identifier; and
a control circuit configured to compare the received identifier to one or more of the plurality of identifiers stored in memory and to cause the transmitter to transmit, based on the comparison, at least one message associated with the manufacturer based on the at least one message stored in memory, the algorithm for generating a message, or the at least one message and the algorithm for generating the message;
wherein the control circuit is configured to transmit a plurality of different messages associated with the manufacturer indicated by the received identifier during a process of training the control system to send authenticated transmissions to the remote receiver.

9. The control system of claim 8, wherein the control circuit configures itself for future operation to output a legacy message associated with the manufacturer indicated by the received identifier.

10. The control system of claim 8, wherein the interface is configured to receive input from a user interface at which a user can indicate the manufacturer of their remote control system.

11. The control system of claim 8, wherein the interface comprises receiving circuit configured to receive an indication of the manufacturer of the remote receiver from a remote source, wherein the remote source is at least one of a portable electronic device, a mobile phone, a personal digital assistant, and a remote server.

12. The control system of claim 11, wherein the remote server is associated with a web site configured to determine the identifier of the remote receiver utilizing a graphical user interface displayed to the user.

13. The control system of claim 8, wherein the interface is a speech recognition system provided in the vehicle, wherein the control circuit is configured to cause a vehicle audio system and/or an electronic display to prompt the user for information regarding the receiver.

14. The control system of claim 8, wherein the interface comprises a user interface;
wherein the interface is configured to receive an indication of a manufacturer via the user interface.

15. The control system of claim 14, wherein the interface further comprises at least one display element configured to provide display output to the user that indicates the user's currently selected remote receiver manufacturer and/or model.

16. The control system of claim 15, wherein the at least one display element is an LED and the interface is configured to blink the LED to indicate the user's currently selected receiver.

17. The control system of claim 8, wherein the interface is at least one of:
  (a) a connection to a receiver associated with a vehicle remote keyless entry system,
  (b) a connection to a receiver associated with a tire pressure monitoring system,
  (c) a connection to a transceiver configured for use with a hands-free communication module,
  (d) a connection to a mobile phone module, and
  (e) a connection to a transceiver for communicating with a home network.

18. A control system for mounting in a vehicle and for transmitting a signal to a receiver associated with a device for opening or closing a movable barrier when the receiving device receives an authorized signal, the receiving device associated with an original transmitter, the control system comprising:
a receiver configured to receive and recognize a discrete identifier message from the original transmitter before or after a data message;

a circuit configured to be provided the discrete identifier message and configured to analyze the discrete identifier message to determine a manufacturer of the remote control system;

an input from a user interface for receiving a command to transmit a control signal to the receiving device;

a transmitter for transmitting control signals to the receiving device;

wherein the circuit is configured to cause the transmitter to transmit a first control signal based on the manufacturer in response to a first command received at the input;

wherein the circuit is configured to cause the transmitter to transmit a second control signal based on the manufacturer, and having a different transmission scheme relative to the first control signal, in response to a second command received at the input;

wherein the circuit is configured to receive an indication from the user at the input to indicate whether the first control signal or the second control signal caused the device for opening or closing a movable barrier to respond; and wherein the circuit configured itself for future transmissions to the receiving device based on the received indication.

19. The control system of claim 1, wherein the determination is not based on an input received from a user.

20. The control system of claim 1, wherein the determination is not based on the success or failure of a transmission from the transmitter.

* * * * *